Patented Aug. 22, 1950

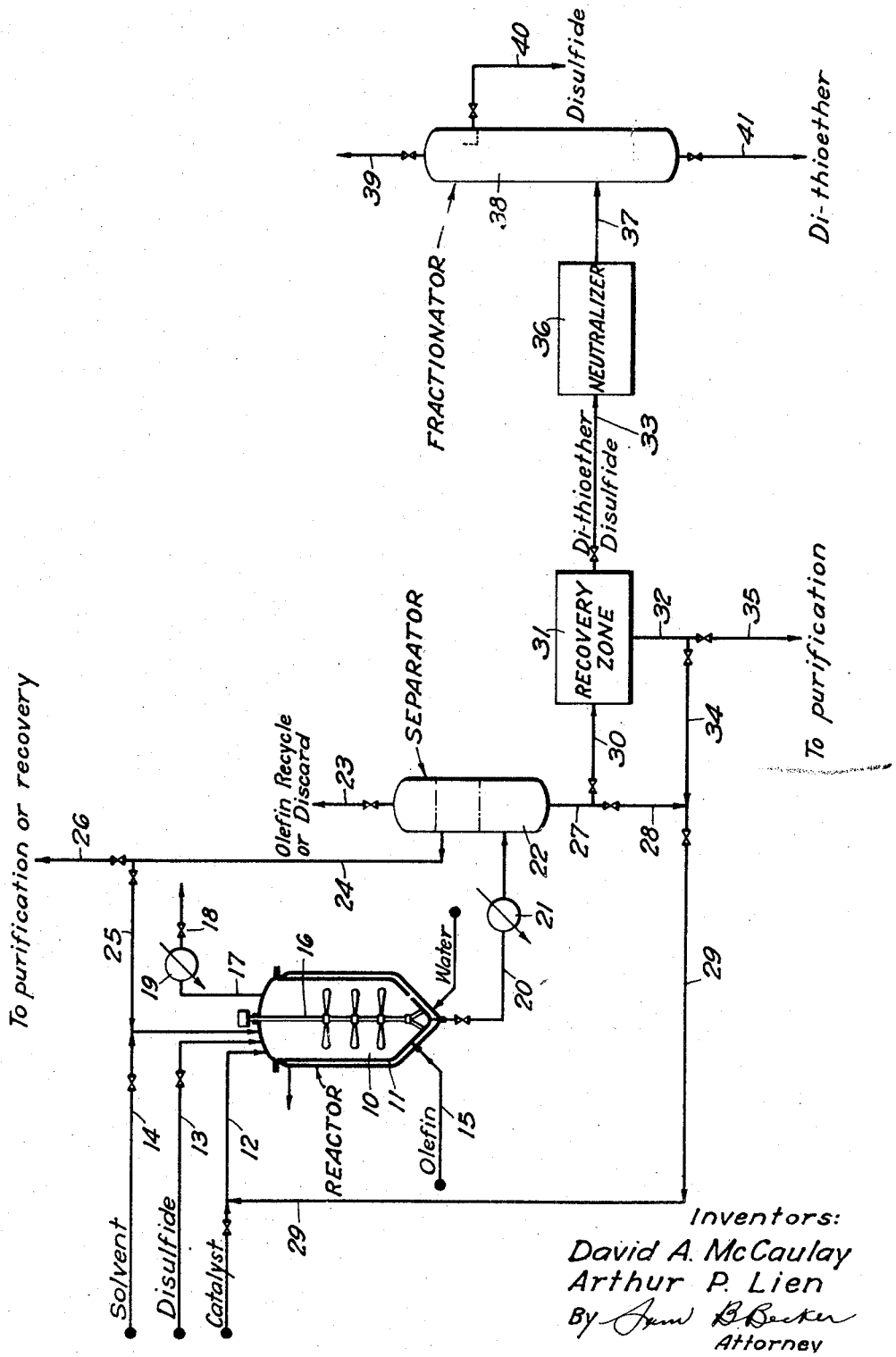

2,519,586

UNITED STATES PATENT OFFICE 2,519,586

CONVERSION OF OLEFINS AND DISULFIDES

David A. McCaulay, Chicago, Ill., and Arthur P. Lien, Hammond, Ind., assignors to Standard Oil Company, Chicago, Ill., a corporation of Indiana Application June 18, 1947, Serial No. 755,456

29 Claims. (Cl. 260—609)

This invention relates to a catalytic process for effecting the interaction of organic disulfides with olefinic compounds. More particularly it relates to a process for the preparation of dithioethers by the reaction of an organic disulfide with an organic compound containing olefinic unsaturation in the presence of an acidic condensation catalyst.

Di-thioethers have heretofore been synthesized by laborious and expensive methods, such as the reaction of a metal salt of a mercaptan with an alkene dihalide, for example sodium ethyl mercaptide with ethylene dibromide (Ber. 4, 716 (1871)). The conventional method is expensive because it requires the use of costly starting materials, whereas the starting materials employed in the process which will be described hereinafter are relatively cheap and are usually available as petroleum by-products having, in themselves, a very limited market value.

It is an object of our invention to provide novel processes for the preparation of di-thioethers. Another object of our invention is to provide processes for the preparation of di-thioethers by reaction between organic disulfides and olefins or materials capable of generating olefins under the reaction conditions. An additional object of our invention is to provide processes for the conversion of by-product petroleum sulfur compounds and olefins into di-thioethers. A further object is to provide new catalysts for the interaction of olefins with disulfides to form dithioethers. Yet another object of our invention is to provide processes for the separation of the di-thioethers produced by our processes from the acidic condensation catalysts employed herein.

An additional object of our invention is to provide processes for the preparation of dithioethers from olefins and di-sulfides wherein the condensation catalyst which is employed functions also as a solvent for the di-thioethers which are produced. Still another object is to provide the art with new di-thioethers. These and other objects of our invention will become apparent from the ensuing description thereof read in connection with the accompanying flow diagram.

The reaction with which the present invention is concerned may be expressed in terms of the following equation:

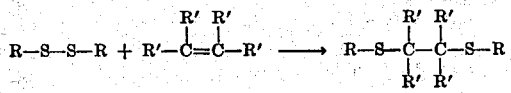

wherein each R represents an organic radical and each R' may be hydrogen or an organic radical.

We have made the surprising discovery that the reaction characterized above can be catalyzed by the employment of acidic condensation catalysts, such as have hitherto been employed to facilitate the alkylation of aromatic or isoparaffinic hydrocarbons with mono-olefinic hydrocarbons. Examples of acidic condensation catalysts are strong acids such as concentrated sulfuric acid (about 60 to about 98%) halogen sulfonic acids such as chloro- or fluosulfonic acids; benzenesulfonic, toluenesulfonic, methanesulfonic, ethanesulfonic acids and the like; concentrated or substantially anhydrous hydrogen fluoride; phosphorus acids, for example meta-, pyro-, ortho- and tetra-phosphoric acids; trichloroacetic and trifluoroacetic acids, $BF_3$ in combination with trifluoroacetic acid; dihydroxyfluoboric acid, alone or in combination with $BF_3$; ansolvo acids in combination with relatively weak acids, for example the combination of zinc chloride with acetic acid, and the like.

The term "acidic condensation catalyst" also includes acid-acting metal halide condensation catalysts such as have heretofore been found effective for the alkylation of aromatic or isoparaffinic hydrocarbons with mono-olefinic hydrocarbons. These have sometimes been classified as Friedel-Crafts catalysts and include aluminum chloride and its complexes with various organic compounds, particularly hydrocarbons; boron fluoride or its complexes such as hydrates, etherates, alcoholates, esterates and the like; ferric chloride, stannic chloride, gallium chloride, germanium chloride, zirconium chloride, titanium chloride, beryllium chloride, columbium chloride, tantalum chloride, aluminum bromide, sodium aluminum chloride and the like. It is sometimes advantageous to employ the metal halide condensation catalysts in combination with a small proportion by weight of a hydrohalogen acid promoter, for example hydrogen chloride.

The process of this invention may be applied to organic disulfides in general. They may be symmetrical or unsymmetrical disulfides; i. e., the disulfides may have the general formula $R_1SSR_2$ wherein $R_1$ and $R_2$ are organic radicals which may be the same or different. The process of this invention may be applied to acyclic or cyclic hydrocarbon disulfides containing radicals such as alkyl, cycloalkyl, cycloalkyl-alkyl, aryl-cycloalkyl, alkenyl, cycloalkenyl, aryl, alkaryl, cycloalkyl-aryl, arlkyl, and the like. Thus disulfides such as the following may be employed in the process of this invention: dimethyl, diethyl, di-n-propyl, diisopropyl, methyl ethyl, methyl propyl, methyl butyl, dibutyl, dilauryl, dicetyl, dicyclohexyl, dicresyl, diphenyl, ditolyl, phenyl tolyl, dixenyl.

It is not essential to use pure disulfides in the process of this invention. The invention may be applied to mixtures of disulfides and mercaptans and to industrially available materials containing disulfides. In the petroleum industry various "sour" (mercaptan-containing) hydrocarbon fractions are subjected to sweetening operations which result in the oxidation of hydrocarbon thiols in the hydrocarbon fractions to the corresponding disulfides. Gasoline, naphthas, kerosenes and other illuminating oils, stove oils, hydrocarbon fractions intended for use as Diesel fuels, lubricating oils, gas oils, and even crude oil may be sweetened by such well-known processes as "doctor" treating, air sweetening, sweetening with copper compounds such as cupric chloride adsorbed on clays, hypochlorite sweetening or other known processes, to yield hydrocarbon fractions containing hydrocarbon disulfides. These disulfide-containing hydrocarbon fractions can be used as charging stocks in the process of this invention. When disulfide-containing hydrocarbon fractions are treated with a sufficient quantity of acidic condensation catalyst which will function additionally as a solvent for dithioether reaction products, hydrocarbon fractions which are substantially free of sulfur can be obtained. The application of disulfide-olefin reaction in the presence of liquid hydrogen fluoride as catalyst and solvent to the treatment of disulfide-containing hydrocarbon oils is claimed in applicants' copending application for U. S. Letters Patent, Serial No. 755,457, filed of even date herewith.

It is also well known that concentrated sulfuric acid effects the oxidation of mercaptans contained in hydrocarbon fractions to produce disulfides. Concentrated sulfuric acid is not a very good solvent for the disulfides, with the result that the acid-treated hydrocarbon fraction retains a substantial proportion of the disulfide formed in the treating operation. In accordance with this invention a sulfuric acid-treated hydrocarbon fraction containing disulfides can be treated with an olefin and an acidic condensation catalyst, which may be concentrated sulfuric acid, in a second stage to effect conversion of the disulfides to dithioethers which are preferentially soluble in the acidic condensation catalyst and are, accordingly, extracted from the hydrocarbon fraction by said catalyst-solvent.

The process of this invention may be applied to diverse types of organic compounds containing olefinic saturation. Thus the invention may be practiced with olefinic hydrocarbons, for example, acyclic mono-olefinic hydrocarbons such as ethylene, propylene, 1- or 2-butene, isobutylene, pentenes, hexenes, decenes, cetenes, styrene, vinylacetylene, alpha-alkyl styrenes such as alpha-methyl styrene, alpha- or beta-vinylnaphthalene; polymers of the above and similar olefins, for example diisobutylene which is a mixture of 2,4,4-trimethyl-1- and -2-pentenes, propylene or isobutylene trimers and tetramers, and the like. The olefinic polymer employed may be depolymerizable under the reaction conditions to yield the monomeric olefin which will then enter into reaction with the organic disulfide.

Poly-olefins may also be employed in this invention, for example 1,3-butadiene, isoprene, 2,3-dimethyl-1,3-butadiene, cyclopentadiene, dicyclopentadiene, 1,4-pentadiene, 1,5-hexadiene, divinylbenzene and the like.

We may also employ cyclo-olefins, e. g., cyclohexene, methyl cyclohexenes, cyclopentene, methylcyclopentenes, terpenes, 3-vinylcyclohexene, cyclohexadiene-1,3-, p-benzoquinone.

We may also employ a variety of substituted olefins in the practice of this invention, for example dichlorostyrenes, trifluoromethylvinylbenzenes; vinyl heterocyclic compounds such as vinylthiophenes, vinylfuranes and vinyl pyridines; methylvinyl ketone, vinyl acetate, esters of crotonic, acrylic, methacrylic or sorbic acids, etc.

The process of the present invention may be practiced not only with olefinic compounds but also with materials capable of yielding these compounds under reaction conditions. Thus, as has been pointed out above, depolymerizable polymers may be employed as a source of olefin monomer for the reaction with a disulfide. Examples of such polymers are di-, tri- or tetra-isobutylenes. In the presence of acidic condensation catalysts certain highly branched chain paraffinic hydrocarbons undergo cleavage to yield olefinic hydrocarbons and may be employed as a source of olefins for the present invention; a suitable example of such a highly branched chain paraffin hydrocarbon is commercial isooctane which comprises predominantly 2,2,4 - trimethylpentane. Cycloalkanes of highly strained ring structure such as cyclopropane and substituted cyclopropanes, e. g. methyl- or ethyl-cyclopropane, can function as a source of propylene or substituted propylenes in the presence of acidic condensation catalysts.

Certain derivatives of olefin hydrocarbons are unstable in the presence of acidic condensation catalysts and are capable of yielding olefins in their presence. This is especially true of derivatives of tertiary olefins. These derivatives comprise mercaptans, alcohols, ethers, halides and the like. Examples are tert-butylmercaptan, ethanol, isopropanol, tert-butanol, di-tert-butyl ether, tertiary octyl chlorides, tert-methylcyclopentyl chloride, tert-butylchloride, tert-amyl chloride.

Because of the variety of reactants and catalysts which may be employed in the practice of the process of this invention it would be impractical to set out the precise or preferred operating conditions for each of the possible permutations and variations contemplated herein. In general, suitable temperatures for the reaction are between about —40° F. and about 250° F. Usually it is desirable to operate at a temperature within the range of about 0° F. to about 150° F.

The reaction under consideration proceeds readily at atmospheric or elevated pressures, for example 50, 100, 500, 1,000 p. s. i. g. or even higher pressures. The pressure and temperature in the reaction zone are ordinarily correlated to maintain the organic disulfide and the catalyst in the liquid phase, although a vapor phase reaction is not excluded. Sufficient pressure may be maintained upon the reaction zone to maintain the olefin in the liquid phase or in solution.

Sufficient time is allowed to obtain the desired amount of conversion. Usually the reaction conditions can be adjusted to obtain a fairly rapid reaction so that reaction periods may be varied between 1 minute and several hours, for example 5 to 10 hours. Ordinarily the residence time of the reactants in the reactor is of the order of about 5 to 30 minutes.

In the reaction zone the olefinic compound and organic disulfide are preferably maintained in a mol ratio of about 1 although in some cases it may be desirable to use an excess of one or the other reactant.

The acidic condensation catalyst is employed in a quantity sufficient at least to catalyze the reaction in question so that it proceeds at a desirable rate under the other reaction conditions which are selected. As has been pointed out above a wide variety of acidic condensation catalysts may be employed to facilitate the reaction of an olefinic compound with an organic disulfide. It should not be implied that these catalysts are precisely equivalent when employed to facilitate the reaction being considered here. Accordingly, considerable variation in the amount of catalyst to be employed may be expected, depending upon the precise catalyst selected and the other reaction conditions under which its employment is contemplated. Ordinarily the employment of at least one mol of the strong acid condensation catalyst per mol of disulfide is desirable. Liquid or liquefied strong acid condensation catalysts such as sulfuric, hydrofluoric or phosphoric acids are also solvents for the di-thioether produced in the reaction. When the strong acid condensation catalyst is to be employed also as a solvent for the reaction product, relatively large volumes of the catalyst are used with respect to the organic disulfide reactant; 70, 100 or an even larger number of mols of the liquid strong acid catalyst may be employed per mol of disulfide. The amount of strong acid catalyst employed should be sufficient to form a distinct liquid phase in which the acid is the predominant component.

The order of combining the reactants and catalyst will depend upon the particular starting materials employed. It is ordinarily satisfactory to combine the catalyst and reactants simultaneously in the reactor. In one modification the disulfide and olefinic compound may each be passed into contact with a body of catalyst in the reactor; alternatively the disulfide and the catalyst may be mixed at a temperature at which reaction does not take place between them and the mixture may thereafter be contacted with the olefinic compound. Variations in the order of addition of the reagents and catalyst can readily be worked out to best suit particular cases. When an olefin which is readily polymerizable is to be employed it is desirable to avoid contact of the olefin with the condensation catalyst in the absence of the organic disulfide. When a disulfide is employed which readily undergoes cleavage reactions with the catalyst, it is desirable to contact the disulfide simultaneously with the catalyst and olefinic compound, or to contact a mixture of disulfide and olefinic compound with the catalyst.

The reaction of an olefinic compound with disulfide proceeds with considerable evolution of heat. In order to maintain the reaction temperature within desired limits it is usually desirable to cool the contents of the reactor during the course of the reaction. Cooling may be effected by indirect heat exchange with a cooling fluid and/or by employing a diluent or solvent in the reaction zone to absorb at least part of the heat of reaction. Thus, volatile solvents may be employed which are vaporized by the exothermic reaction and are thereafter condensed and returned to the reaction zone. Suitable solvents include paraffinic hydrocarbons which are resistant to the action of the acidic condensation catalysts under the reaction conditions, for example naphthas, petroleum ether, liquefied propane, butane and the like.

The particular technique for separating the desired product from the mixture derived from the reaction zone will depend upon the particular reactants, catalysts, solvents, etc. When the catalyst is employed in sufficient amount to function also as a solvent for the di-thioether reaction product, the di-thioether may be recovered from the catalyst by dilution or neutralization. When a volatile catalyst such as liquid hydrogen fluoride is employed it may be removed from associated di-thioether by distillation, azeotropic distillation, vacuum distillation or the like. The di-thioether retained in any solvent which might be used in the reactor or otherwise not absorbed in the catalyst layer, can usually be separated from accompanying materials by fractional distillation, azeotropic distillation, fractional crystallization or similar well-known separation techniques.

Reference is made at this point to the figure, which depicts one embodiment of the process of our invention. In the flow diagram shown, the reactor 10 is provided with a cooling jacket (or cooling coils) 11 through which a cooling fluid may be circulated to aid in maintaining a desired temperature in the reactor. A catalyst, for example commercial liquid hydrogen fluoride, is charged into the reactor through line 12. An organic disulfide, for example ethyl disulfide, is charged into the reactor through line 13. If desired, a solvent, for example n-heptane, can be charged into the reactor through line 14. An olefin, for example ethylene, is charged into the reactor through line 15. If desired, the olefin and disulfide respectively, may be dissolved or dispersed in a solvent before passing into the reactor. In the ractor, the reactants, catalyst and solvent are brought into intimate contact by agitator 16 or other suitable mixing device. In a desirable mode of operation the disulfide, catalyst and solvent are charged to the reactor and the olefin is added in increments over the course of the reaction period. The reaction generates heat, part of which is removed by the fluid circulating through cooling jacket 11 and part by vapors of the solvent and reactants which pass into line 17 containing a back pressure valve 18 and condenser 19 which liquefies the vapors so that they may reflux back into the reactor. Suitable reaction temperatures, for example, lie between about 100° F. and about 150° F. and suitable pressures are about 10 to about 150 p. s. i. g. After the reaction has proceeded to the desired extent, for example after a residence time of the reactants and catalyst in the reactor of about 1 hour, the reaction mixture is withdrawn from the reactor through valved line 20 and passed through cooler 21 wherein its temperature is reduced to a desired value, for example between about 60° F. and about 80° F., whence it is passed into separator 22.

Ordinarily, a sufficient amount of the catalyst is employed to function also as a solvent for the reaction product. Thus, for example about one volume of commercial liquid hydrogen fluoride can be employed per volume of organic disulfide feed stock. In the separator two liquid phases are formed. The lower phase is a solution of the di-thioether reaction product in liquid hydrogen fluoride. The catalyst phase also exhibits some solvent capacity for the organic disulfide reactant. The upper phase comprises the hydrocarbon solvent and some of the organic disulfide reactant. Olefins which are normally gaseous and which have escaped reaction and other gases may be vented through valved line 23. The phase comprising predominantly hydrocarbon solvent is withdrawn from the separator through line 24 and may be recycled to the reactor through valved lines 25 and 14. All or a portion of the solvent phase may be withdrawn through valved line 26 for purification or separation of the phase into its constituents such as unreacted disulfide and solvent, each of which can, if desired, be returned to the reactor. When an insufficient amount of catalyst is employed to function also as a solvent for the reaction product, a substantial portion of the reaction product is present in the hydrocarbon solvent phase and can be recovered therefrom by more or less conventional methods such as fractional distillation, following which the solvent and unreacted materials are returned to the reactor. The lower phase in the separator, in which the catalyst predominates, is withdrawn through valved line 27 and, if it is desired to recycle catalyst and the compounds absorbed therein to the reactor, is passed through valved lines 28, 29 and line 12 into reactor 10. Ordinarily it will be desirable to separate catalyst from materials dissolved therein before recycle.

When the catalyst is used in sufficient quantity to function also as a solvent, part or all of the lower phase from separator 22 is passed through lines 27 and 30 into a recovery zone 31 which is schematically illustrated. By way of example, if hydrogen fluoride is employed as the catalyst, recovery zone 31 may take the form of a distillation zone, catalyst being vaporized and removed from said zone through valved line 32. To aid in removing the catalyst from material absorbed or dissolved therein, the recovery zone may be operated under reduced pressure or minimum-boiling azeotrope froming agents such as propane, butanes or pentanes may be passed into the zone to distill with the hydrogen fluoride. The residue from the recovery zone will ordinarily consists of a mixture of unreacted disulfide and di-thioether which are removed by valved line 33. The catalyst withdrawn from the recovery zone through line 32 may be recycled to the reactor through valved lines 34, 29 and 12. All or part of the catalyst may be passed through valved line 35 to a purification zone, for example a distillation zone in the case of HF, or to a zone where fresh catalyst is added to fortify the used catalyst, before recycling catalyst to the reactor.

The sulfur compounds withdrawn from the recovery zone through line 33 are passed through a neutralizer 36 wherein they are contacted with alkaline materials such as aqueous caustic to remove small amounts of acid catalyst contained therein. From the neutralizer the sulfur compounds are passed through line 37 into a fractionator 38. Fractionator 38 is operated at reduced pressure and is provided with a valved gas vent 39. Unreacted disulfide may be removed from the fractionator through valved line 40 for recycle to reactor 10 and the di-thioether reaction product may be removed through valved line 41 to storage or ulterior treatment.

The following examples are intended to illustrate but not unduly to limit the scope of our invention.

*Example 1*

A mixture of 395 g. of ethyl disulfide and 345 cc. of commercial, substantially anhydrous liquid hydrogen fluoride was prepared in a closed steel reactor, equipped with an agitator and cooling jacket, by agitation at 88° F. Ethylene was passed into the gas phase over the agitated mixture of HF and ethyl disulfide over a period of one hour and the contents of the reactor were cooled through the heat exchange jacket to maintain the temperature of the reactants below 150° F. At the end of this time the partial pressure of the ethylene was 385 p. s. i. g. and the absorption of this gas had ceased. The reaction products were drawn from the reactor into an open copper beaker and were found to weigh 795 g. A portion of the liquid product (65.5 weight per cent) was neutralized by shaking with pellets of KOH and thereafter filtered from the solid residue and found to weigh 159 g. Pentane extraction of the solid residue derived from the filtration, followed by distillation of pentane from the extracted materials yielded an additional 56 g. of oil product. After being subjected to extraction with pentane, the solid residue was digested with water and the aqueous solution was extracted with pentane to yield an additional 10 grams of oil extract. The total oil product recovery was 225 g., which converted to a total product basis (by dividing by 0.655) is equal to 344 g. This represents a 71% yield based on conversion of the disulfide to di-thioether. A sample of the liquid product was fractionated in a 30 plate, ½ inch Stedman-packed fractionating column. The fractionation data show that the product is composed approximately of 19% of ethyl thioether (diethyl sulfide) having a refractive index ($n_D^{20}$) of 1.4423, normal boiling point of 93° C. and specific gravity of 0.834, and of about 70% of 1,2-bis (ethylmercapto-) ethane having a refractive index ($n_D^{20}$) of 1.5101, normal boiling point of 217° C. and specific gravity of 0.977. The boiling point of 1,2-bis (ethylmercapto-) ethane has been reported as 210° C. to 213° C. (Ber. 4, 716 (1871)). A disulfone and a mercuric iodide complex were prepared from samples of the 1,2-bis (ethylmercapto-) ethane produced, and their melting points were compared with the literature values.

| Di-thioether Derivative | Melting Point Observed | Melting Point in Literature |
| --- | --- | --- |
|  | °C. | °C. |
| Disulfone | 137 | [1] 136.5 |
| Mercuric iodide complex | 100 | [2] 103 |

[1] Otto, J. Prakt. Chem., (2) 36, 437 (1887).
[2] J. Chem. Soc. 1930, 1668.

The literature and observed values agree closely, providing that the product has been correctly identified. The reaction which occurred is represented by the equation $C_2H_5-S-S-C_2H_5 + H_2C=CH_2 \rightarrow$ $C_2H_5-S-CH_2-CH_2-S-C_2H_5$

*Example 2*

A blend of 11 weight per cent of ethyl disulfide in n-heptane (5.6 wt. per cent sulfur) was contacted with commercial liquid hydrogen fluoride in an amount equal to 20 volume per cent based on the volume of the blend at room temperature in the presence of ethylene. The resultant mixture was agitated for 1 hour and thereafter allowed to stratify into an upper, predominantly hydrocarbon phase and a lower predominantly acid phase. Sulfur analyses of the phases indicated that 99% desulfurization of the n-heptane occurred. The thylene reacted with the ethyl disulfide to form 1,2-bis (ethylmercapto-) ethane which was preferentially soluble in the hydrogen fluoride. The sulfur compound in the hydrogen fluoride phase formed both a mercuric chloride and a mercuric iodide complex. The di-thioether which was separated from its solution or complex with the liquid hydrogen fluoride was found to have a refractive index ($n_D^{20}$) 1.5002."

Example 3

A blend of n-octyl disulfide in n-heptane containing 1.50 weight per cent of sulfur was agitated at room temperature for one hour with 20 volume per cent of commercial, liquid, substantially anhydrous hydrogen fluoride, based on the volume of the blend, and 1 mole of diisobutylene per mole of disulfide contained in the blend. Thereafter the reaction mixture was allowed to stratify into an upper, predominantly hydrocarbon phase and a lower, predominantly acid phase. Sulfur analyses indicated that 95 weight per cent desulfurization of the n-heptane had occurred. Under otherwise identical operating conditions but in the absence of diisobutylene only 9 weight per cent desulfurization of the n-heptane occurred. This demonstrated that n-octyl disulfide is relatively insoluble in liquid hydrogen fluoride at normal temperature but that it was converted by diisobutylene into a derivative which is highly soluble in liquid hydrogen fluoride viz., a di-thioether, probably 1,2-bis (octylmercapto-) 1,1-dimethylethane.

Example 4

A blend of 6.1 weight per cent of n-octyl disulfide in n-heptane was agitated for 5 minutes at room temperature with 50 volume per cent of concentrated sulfuric acid (sp. gr., 1.84) and 1 mole of diisobutylene per mole of disulfide in the blend. The reaction mixture was thereafter allowed to stratify into an upper, predominantly hydrocarbon layer and a lower, predominantly acid layer. Sulfur analyses indicated that 94 weight per cent desulfurization of the n-heptane had occurred. n-Octyl disulfide is relatively insoluble in concentrated sulfuric acid at room temperature as shown by the fact that application of the above technique (in the absence of olefin) to a blend of 7.4 weight per cent of n-octyl disulfide in n-heptane resulted in the removal of only 16 weight per cent of the sulfur contained in the n-heptane. It is apparent, therefore, that when an olefin is present, the disulfide reacts with it to form a derivative which is extremely soluble in concentrated sulfuric acid, viz., a di-thioether.

It will be apparent that our invention is capable of considerable variation and modification, and that it is capable of general application.

The di-thioethers produced by the process of this invention are capable of varied applications. Thus, they may be subjected to oxidation to produce disulfones, some of which may be useful as hypnotics. They may also be subjected to a wide variety of chemical reactions, e. g., halogenation, pyrolysis, reactions with alkyl halides, etc. to produce interesting derivatives or conversion products. Also the organic radicals in the di-thioethers produced by the process of this invention may contain reactive substituents such as halogen, nitro, cyano and the like which can be converted to produce interesting derivatives.

Certain di-thioethers can be applied as addition agents to hydrocarbon oils such as gasoline, lubricating oils, transformer oils, etc. Disulfones can be produced by oxidation of di-thioethers and may find application as waxes and also as plasticizers in various resins, e. g., vinyl resins, such as polyvinyl chloride-acetate copolymers, in alkyd resins, etc. Numerous other applications of di-thioethers and their derivatives will, no doubt, suggest themselves to those skilled in the art.

Having thus described our invention what we claim is:

1. A process for the preparation of a di-thioether which comprises reacting an organic disulfide with a compound affording a mono-olefinic hydrocarbon in the presence of a chemical compound which is an acidic condensation catalyst.

2. The process of claim 1 wherein the catalyst is concentrated sulfuric acid.

3. The process of claim 1 wherein the catalyst is concentrated hydrogen fluoride.

4. The process of claim 1 wherein the catalyst is phosphoric acid.

5. The process of claim 1 wherein the catalyst is boron fluoride.

6. The process of claim 1 wherein the catalyst is ethanesulfonic acid.

7. A process which comprises reacting an organic disulfide with a non-tertiary mono-olefinic hydrocarbon in the presence of a chemical compound which is an acidic condensation catalyst.

8. A process which comprises reacting an organic disulfide with a compound affording a mono-olefinic hydrocarbon in the presence of a chemical compound which is an acidic condensation catalyst, and removing heat from the reaction zone during the reaction.

9. A process for the preparation of a di-thioether which comprises reacting an organic disulfide having the formula $R_1SSR_2$ wherein $R_1$ and $R_2$ are hydrocarbon radicals with an olefinic hydrocarbon in the presence of a chemical compound which is an acidic condensation catalyst.

10. A process for the preparation of a di-thioether which comprises reacting a hydrocarbon disulfide with a polymer of a mono-olefinic hydrocarbon in the presence of a chemical compound which is an acidic condensation catalyst, and separating a di-thioether thus produced.

11. A process for the preparation of a di-thioether which comprises reacting a hydrocarbon disulfide with a mono-olefinic hydrocarbon in the presence of a strong, liquid acid catalyst.

12. A process which comprises reacting a hydrocarbon disulfide with a non-tertiary mono-olefinic hydrocarbon in the presence of a chemical compound which is an acidic condensation catalyst.

13. A process for the preparation of a di-thioether which comprises reacting a hydrocarbon disulfide with an olefinic compound having the formula

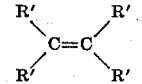

in which each R' is selected from the group consisting of hydrogen and organic radicals in the presence of a chemical compound which is an acidic condensation catalyst.

14. The process of claim 13 wherein the catalyst is liquid, substantially anhydrous hydrogen fluoride.

15. A process for the preparation of a di-thioether which comprises reacting a hydrocarbon disulfide with a mono-olefinic hydrocarbon in the presence of liquid, substantially anhydrous hydrogen fluoride in quantity sufficient to form a distinct liquid phase in which hydrogen fluoride predominates, at a temperature between about 0° F. and about 150° F., thereafter separating from the reaction mixture a liquid layer comprising predominantly liquid hydrogen fluoride and containing a di-thioether reaction product in solution in said hydrogen fluoride, and thereafter separating hydrogen fluoride and said di-thioether reaction product, respectively, from said liquid layer.

16. The process of claim 15 wherein hydrogen fluoride is vaporized to separate it from said liquid layer.

17. The process of claim 15 wherein the hydrocarbon disulfide is an alkyl disulfide.

18. A process for the preparation of a di-thioether which comprises reacting an alkyl disulfide with a mono-olefinic hydrocarbon in the presence of a chemical compound which is an acidic condensation catalyst.

19. The process of claim 18 wherein the catalyst is concentrated sulfuric acid.

20. The process of claim 18 wherein the catalyst is hydrogen fluoride.

21. The process of claim 18 wherein the catalyst is phosphoric acid.

22. The process of claim 18 wherein the catalyst is boron fluoride.

23. The process of claim 18 wherein the catalyst is ethanesulfonic acid.

24. A process for the preparation of a di-thioether which comprises reacting an alkyl disulfide with a mono-olefinic hydrocarbon in the presence of a strong, liquid acid catalyst.

25. A process for the preparation of a di-thioether which comprises reacting an alkyl disulfide with a mono-olefinic hydrocarbon in the presence of a strong, liquid acid catalyst at a temperature between about 0° F. and about 150° F.

26. A process for the preparation of a di-thioether which comprises reacting an alkyl disulfide with an olefinic compound having the formula

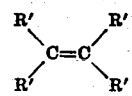

wherein each R' is selected from the group consisting of hydrogen and organic radicals in the presence of liquid, substantially anhydrous hydrogen fluoride.

27. A process for the preparation of a di-thioether which comprises reacting an alkyl disulfide with a mono-olefinic hydrocarbon in the presence of liquid, substantially anhydrous hydrogen fluoride in quantity sufficient to form a distinct liquid phase in which hydrogen fluoride predominates at a temperature between about −40° F. and about 250° F., and separating a di-thioether thus produced.

28. A process for the preparation of a di-thioether which comprises reacting an alkyl disulfide with a mono-olefinic hydrocarbon in the presence of concentrated sulfuric acid in quantity sufficient at least to form a distinct liquid phase in which sulfuric acid predominates at a temperature between about 0° F. and about 100° F., and separating a di-thioether thus produced.

29. A process for the preparation of 1,2-bis (ethylmercapto-) ethane which comprises reacting ethyl disulfide with ethylene in the presence of liquid, substantially anhydrous hydrogen fluoride.

DAVID A. McCAULAY.
ARTHUR P. LIEN.

REFERENCES CITED

The following references are of record in the file of this patent:

UNITED STATES PATENTS

| Number | Name | Date |
|---|---|---|
| 2,390,099 | Harmon | Dec. 4, 1945 |

OTHER REFERENCES

Holmberg: Arkiv. Kenu Mineral, Geol. 13B, No. 14, 6 pages (1939), Chem. Abst., vol. 34, Col. 2341–2342 (1940).